United States Patent [19]
Winer et al.

[11] 3,827,383
[45] Aug. 6, 1974

[54] SALVAGE METHOD UTILIZING WATER EMULSIFIED POLYESTER RESIN AND HOLLOW MICROSPHERES

[75] Inventors: Allen Winer, Rockville; Robert E. Proodian, Upper Marlboro, both of Md.

[73] Assignee: The United States of America as represented by the Secretary of the Navy, Washington, D.C.

[22] Filed: July 16, 1971

[21] Appl. No.: 163,182

[52] U.S. Cl.................... 114/50, 114/44, 114/69
[51] Int. Cl............................................. B63c 7/12
[58] Field of Search............ 114/44, 50, 52, 54, 69, 114/68, 121; 161/160, DIG. 5; 260/2.5 R, 2.5 EP, 2.5 B; 264/41, 45, DIG. 6; 23/252

[56] References Cited
UNITED STATES PATENTS
| | | | |
|---|---|---|---|
| 2,978,340 | 4/1961 | Veatch et al. | 161/DIG. 5 |
| 3,057,694 | 10/1962 | Kessler | 114/50 X |
| 3,091,205 | 5/1963 | Watson | 114/50 |
| 3,230,184 | 1/1966 | Alford | 260/2.5 B |
| 3,316,187 | 4/1967 | Grosner et al. | 260/2.5 B |
| 3,477,967 | 11/1969 | Resnick | 260/2.5 B |

OTHER PUBLICATIONS
"Glass Microballoon Particles, A Low–Density Filler," Alford, H. E. and Veatch, F., Modern Plastics, Vol. 39, No. 3, November 1961, pp. 141–150, 223.
"Solutions of Drag–Reducing Polymers–Diameter Effect and Rheological Properties," Elliott, J. H. and Stow, F. S., Jr., Journal of Applied Polymer Science, Vol. 15, May 11, 1971, pp. 2,743–2,748.

*Primary Examiner*—Trygve M. Blix
*Assistant Examiner*—Barry L. Kelmachter
*Attorney, Agent, or Firm*—R. S. Sciascia; Q. E. Hodges

[57] ABSTRACT

The invention is a method of supplying buoyancy to sunken objects by the use of a combination of water emulsified polyester resin, water, hollow microspheres, and depending on ambient conditions, a drag reduction agent.

5 Claims, 1 Drawing Figure

PATENTED AUG 6 1974
3,827,383
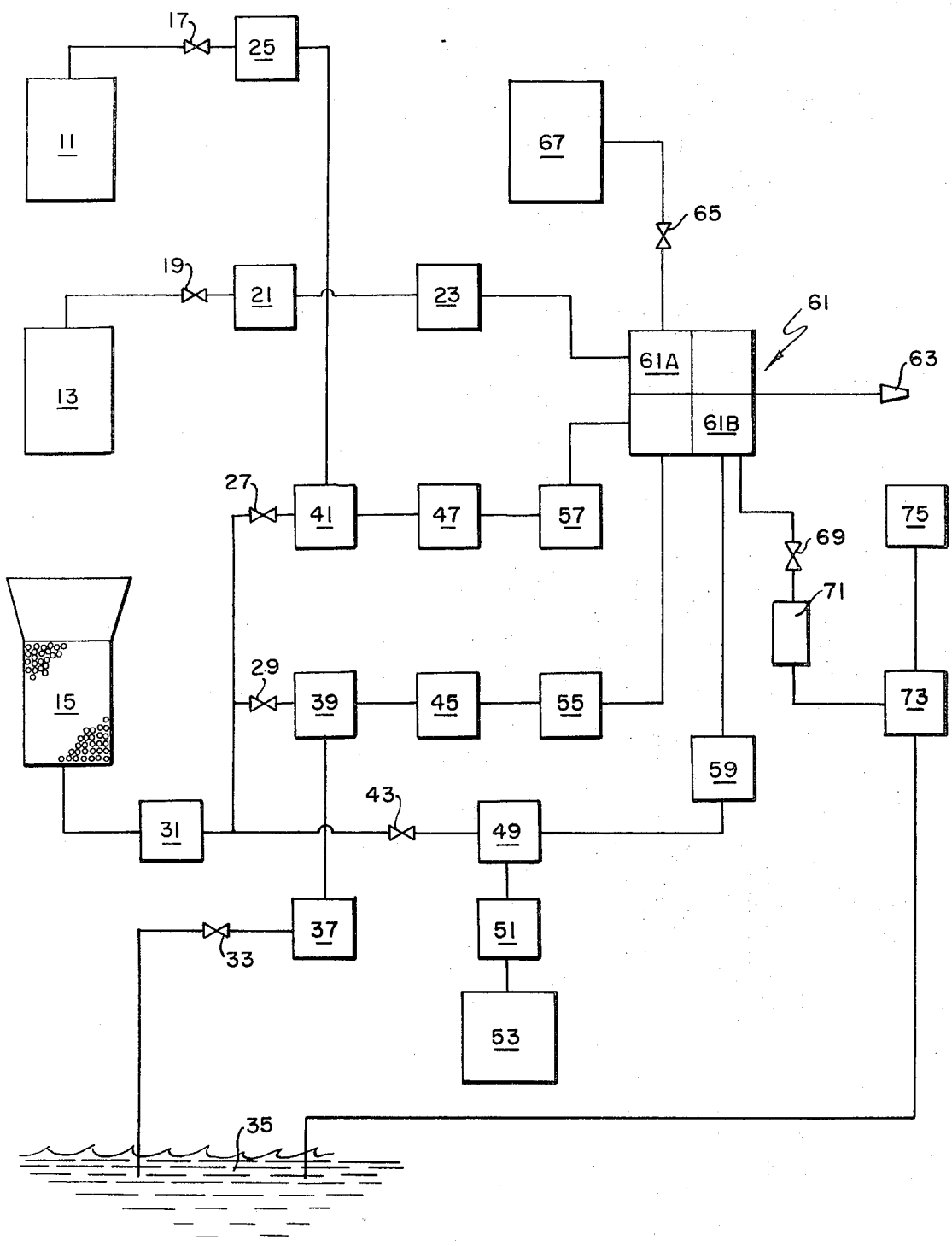
INVENTORS
ALLEN WINER
ROBERT E. PROODIAN
BY *James W. Peterson*
AGENT
*D. E. Hodges*
ATTORNEY

SALVAGE METHOD UTILIZING WATER EMULSIFIED POLYESTER RESIN AND HOLLOW MICROSPHERES

The invention described herein may be manufactured and used by or for the Government of the United States of America for Governmental purposes without the payment of any royalties thereon or therefor.

BACKGROUND OF THE INVENTION

The raising of a submerged object, particularly of a sunken vessel, to the surface of a body of water has long presented a difficult problem. The great weight, ocean depth, and reduced structural integrity have often made it virtually impossible to salvage them.

Conventional salvage methods include the use of pontoons and compressed air with inflatable containers such as rubber bags which are attached while deflated to the vessel. In practice, it is difficult to raise objects of any appreciable size because the number and size of the containers becomes prohibitive. Attempts have been made to raise sunken vessels by pumping into them a large number of relatively small buoyant objects such as hollow glass or plastic balls, cork segments or closed cell foam objects. The buoyant parts are pumped into the body of the vessel and are there released. This approach is expensive and requires complicated equipment since large numbers of each object must be manipulated. The relatively small size may permit them to escape through openings in the vessel. More recently methods have been developed in which mixtures of polymerizable components are injected into the cavity of the vessel. These methods require many individual components and also require gaseous expanding agents. The expanding agents, however, become less effective and more troublesome to handle at increasingly deeper ocean depths.

The present invention overcomes the shortcomings found in the prior art by providing means for imparting buoyancy to a submerged object such as the sunken hull. This means has a low material cost, extended depth capability, and does not depend at all on gaseous expansion of a base resin for buoyancy. It is possible, however, that gaseous expansion could be used as a secondary method for increasing the buoyancy.

SUMMARY OF THE INVENTION

The invention is a method of supplying buoyancy to a sunken object using a water emulsified polyester resin and hollow microspheres.

OBJECTS OF THE INVENTION

It is a primary object of the invention to supply buoyancy to sunken objects at deeper depths than is now possible.

It is a further object of the invention to provide a method of raising sunken objects which economically utilizes either fresh water or seawater.

It is still another object of the present invention to provide a method of salvage which does not depend on the gaseous expansion of a base resin for buoyancy.

Another object is to provide a remotely controlled self-contained unit at depth to generate the required buoyancy.

Other objects and advantages will appear from the drawing and description.

BRIEF DESCRIPTION OF THE DRAWING

The drawing shows in block diagram the method of creating the ship raising medium.

DESCRIPTION OF THE PREFERRED EMBODIMENT

With continued reference to the drawing, this method utilizes a water emulsified polyester resin 11, for example, "Polylite 32-177", whose viscosity is close to that of water. The resin 11 is metered by valve 17 to a low pressure pump 25 and may be heated by an external source 47. Freshwater or seawater 35 is metered by valve 33 and pumped by low pressure pump 37 and may be heated by an external heating source 45. Hollow microspheres 15 are pumped by element 31 to metering valves 27 and 29 and may be premixed in either or both the resin and water by mixing heads 39 and 41 as desired. The hollow microspheres may be made of glass, phenolic, carbon, epoxy, ceramic or other suitable materials. However, it is preferred to mix the microspheres 15 into the emulsion after the emulsion has been formed in order to avoid a high shear condition which could lead to high microsphere breakage. This is accomplished by cutting off valves 27 and 29 and opening valve 43, thereby introducing the microspheres into the static mixing section 61B. A compressed inert gas or liquefied gas bottle 67 (optional) metered by valve 65 provides a source of gas for forming (optional). Polymer compatible oil 53 can optionally be mixed with microspheres 15 by pump 51 and mixing head 49 to separate the microspheres and reduce friction and breakage. The resin and water may be heated separately if required to a suitable working temperature to allow proper curing of the resin when mixed. Heating of ingredients may not be required, depending on ocean water temperature, ocean depth and length of hoses required. Proper amounts of catalyst 13 and a promoter such as methyl ethyl ketone peroxide would also be employed to ensure proper curing of the resin depending on ocean depth and water temperature. Hollow microspheres not limited in particle size, prepressurized if desired to eliminate structural weakness, and binary or tertiary packed if desired, to take advantage of even lower densities would then be metered into both components. The proportions would be predetermined by viscosity and the amount of buoyancy needed. The filled, catalyzed resin and water would then be pumped through insulated hoses (if required) to a mixing head 61 of proper design (either single or dual section — the dual section containing shear and static mixing sections 61A and 61B, respectively). The mixing head would insure proper mixing to form an emulsion of filled resin and water. The mixed material would then be dispensed into the sunken object through the nozzle 63. It is also noted that a hydrodynamic drag reduction ingredient could be introduced to reduce the friction of the microsphere filled water emulsion when pumped through the hose to the nozzle 63. A drag reducing agent 75, for example, polyethylene oxide, is mixed with seawater 35 in mixer 73 and pumped by 71 through valve 69 into the static mixing section 61B. It would be within the scope of the invention to mix the microspheres with the drag reduction agent at an earlier stage to reduce breakage of the microspheres. Such a reduction in friction will allow a larger volume of microspheres to be pumped into the sunken object and will reduce the number of microspheres which would break due to turbulence in the hose.

The final mixture is introduced into the sunken structure. In addition, it is possible to attach exterior pontoons to the structure and fill with the mixture to provide external buoyancy where desired. Instability problems associated with the use of compressed air in pontoons is avoided because the volume of the present material is essentially stable regardless of depth.

The present method may be incorporated into a self-contained unit which may be used at depth to avoid problems encountered in pumping through long hoses. The unit may be remotely controlled from the surface or utilized in a work boat at depth.

It is understood that the invention is not limited to the exact details of construction shown and described for obvious modifications will occur to persons skilled in the art. It is therefore to be understood that within the scope of the appended claims the invention may be practiced otherwise than as specifically described.

What is claimed is:

1. A method for supplying buoyancy to a sunken object, which comprises:
   mixing water, a water emulsified polyester resin, a catalyst and hollow glass microspheres;
   pumping the resulting mixture through a single hose while in the uncured state to any ocean depth;
   injecting the mixture into a sunken object to displace a volume of seawater substantially equal to the volume of said mixture at sea level; and,
   allowing the mixture to cure into a rigid material whereby said glass microspheres are rigidly suspended within the unfoamed cured polyester resin.

2. A method as in claim 1, wherein said mixing comprises first mixing said water, resin and catalyst, into a first mixture and, second mixing said hollow microspheres into said first mixture to create a foam.

3. A method as in claim 2, further including the steps of providing a drag reduction agent; and
   mixing said drag reduction agent with said hollow microspheres before said hollow microspheres are mixed with said first mixture in order to reduce breakage of said hollow microspheres.

4. A method as in claim 3, wherein said drag reduction agent is a polymer compatible oil.

5. A method as in claim 4, further including the step of heating said water, resin and catalyst each individually before said first mixing to provide for proper curing of the resin.

* * * * *